April 21, 1942.  C. B. SPASE ET AL  2,280,355
AUTOMATIC WEAR TAKE-UP FOR FRICTION CLUTCHES
Filed June 24, 1939  3 Sheets-Sheet 2
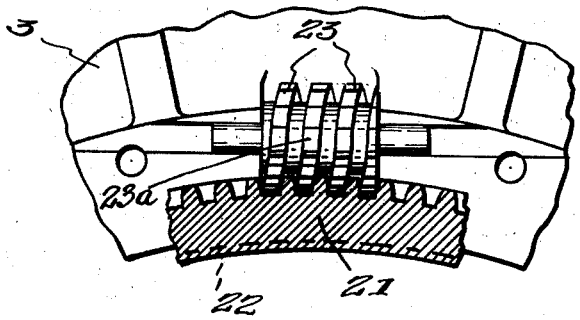
Fig-3-
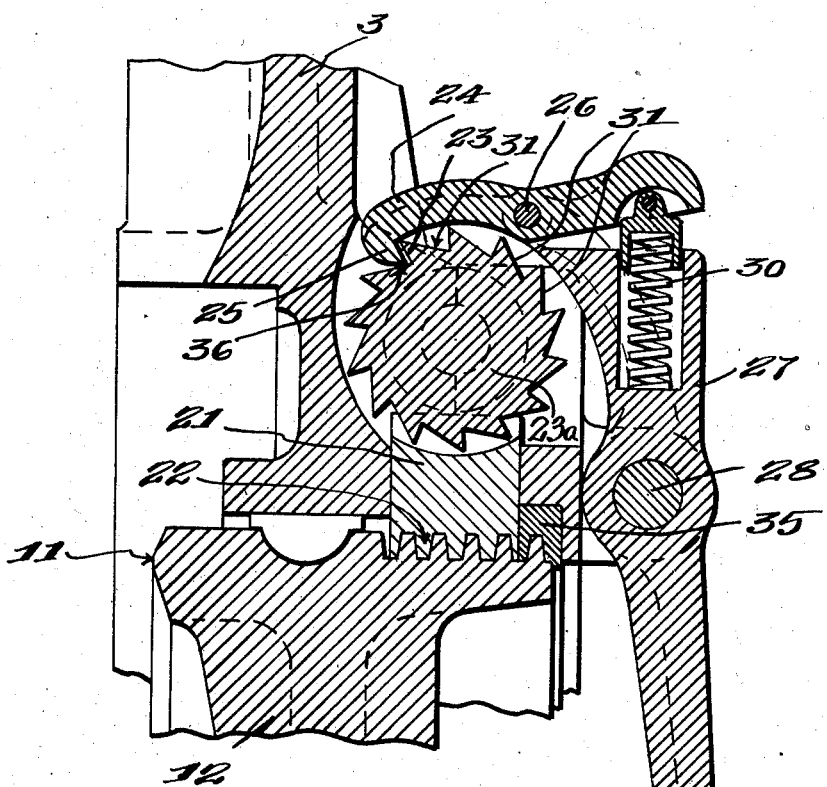
Fig-4-
INVENTORS.
Charles B. Spase Robert S. Root
BY
Budell & Thompson
ATTORNEYS.

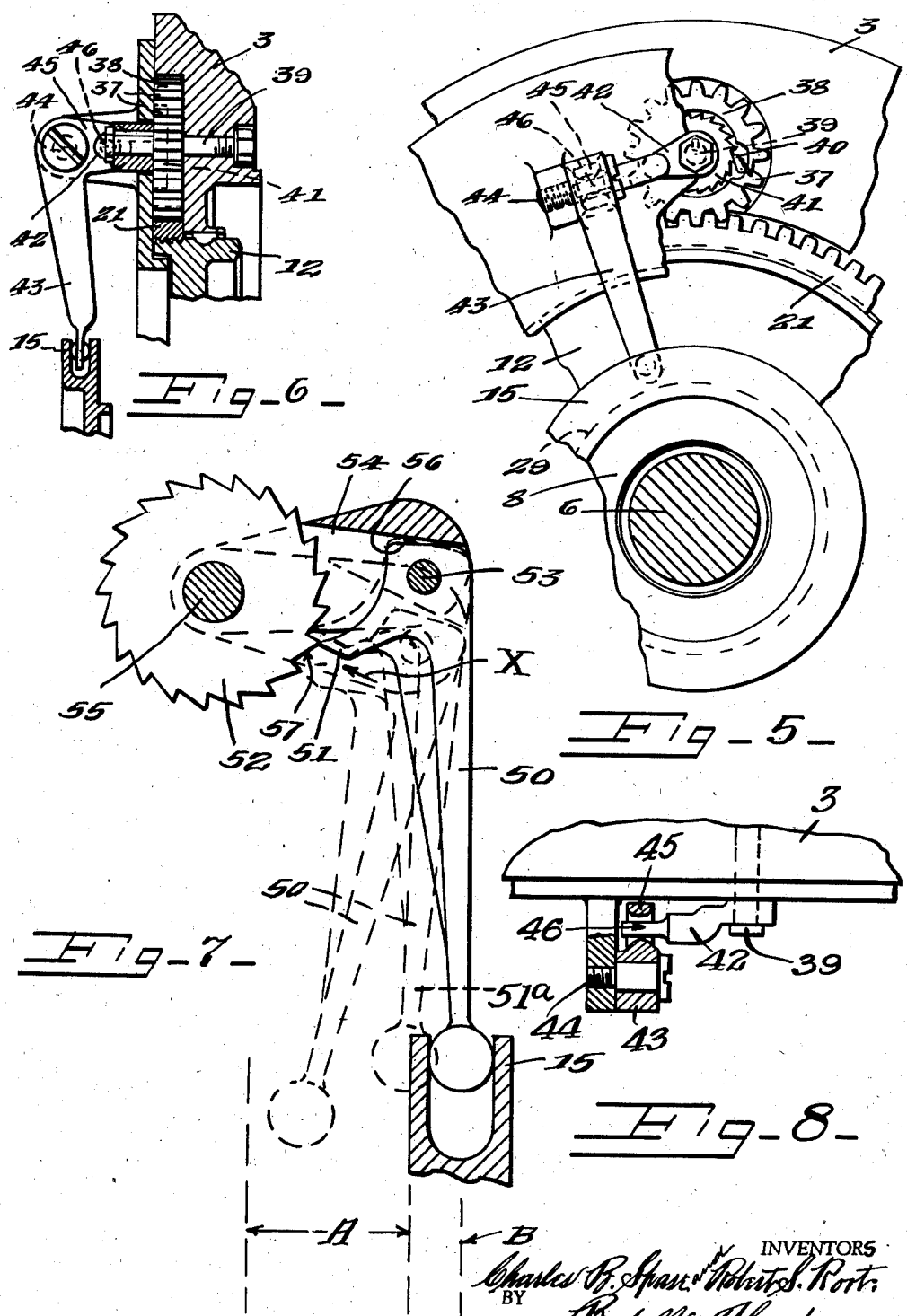

Patented Apr. 21, 1942

2,280,355

UNITED STATES PATENT OFFICE 2,280,355

AUTOMATIC WEAR TAKE-UP FOR FRICTION CLUTCHES

Charles B. Spase, Nedrow, and Robert S. Root, Syracuse, N. Y., assignors to W. C. Lipe, Inc., Syracuse, N. Y., a corporation of New York Application June 24, 1939, Serial No. 280,994

7 Claims. (Cl. 192—111)

This invention relates to friction clutches, such as are used in motor vehicles, and has for its object a particularly simple and efficient means operable by the throw-out mechanism of the clutch for automatically taking up for wear on the friction faces of the clutch.

It further has for its object a wear take-up means which operates during the throwing out or disengaging operation of the clutch and operable to assume a position to adjust the clutch for wear by the movement of the throw-out mechanism beyond its normal starting position.

More specifically, it has for its object an automatic take-up mechanism including a ratchet wheel and a pawl coacting therewith, the ratchet wheel serving as an actuator for a take-up member, and the ratcheting face of each tooth of the ratchet wheel being of such length relative to the distance the throw-out mechanism or the sleeve thereof travels that the pawl normally idles back and forth on the ratchet surface during the operation of the throw-out mechanism and also over-reaches said ratchet surface or a tooth thereof and coacts with the next tooth, when, as a result of the wear on the friction surfaces of the clutch, the throw-out sleeve returns in a retrograde direction beyond its normal starting position, so that upon the next throwing out operation, the pawl is in position to turn the ratchet wheel and the adjusting or take-up member.

It further has for its object an adjusting or take-up member so operated by a ratchet wheel or its equivalent which has a threaded engagement with the part of the clutch or an abutment which is to be adjusted, and which has peripheral gear teeth with which the pinion provided with the ratchet teeth coacts, and more specifically, a construction in which the gear teeth are worm gear teeth and the pinion is a worm meshing with the worm gear teeth.

The invention consists in the novel features and in the combinations and constructions hereinafter set forth and claimed.

In describing this invention, reference is had to the accompanying drawings in which like characters designate corresponding parts in all the views.

Figure 3 is an enlarged elevation of the worm and contiguous portion of the worm gear.

Figure 4 is an enlarged fragmentary view of the worm and coacting parts, as seen in Figure 1.

Figure 5 is a fragmentary elevation of a modified form of adjusting mechanism.

Figure 6 is a detail of the parts seen in Figure 5.

Figure 7 is a fragmentary view of another modified form of the adjusting mechanism.

Figure 8 is a plan view partly in section of parts shown in Figure 5.

Figures 1, 2:
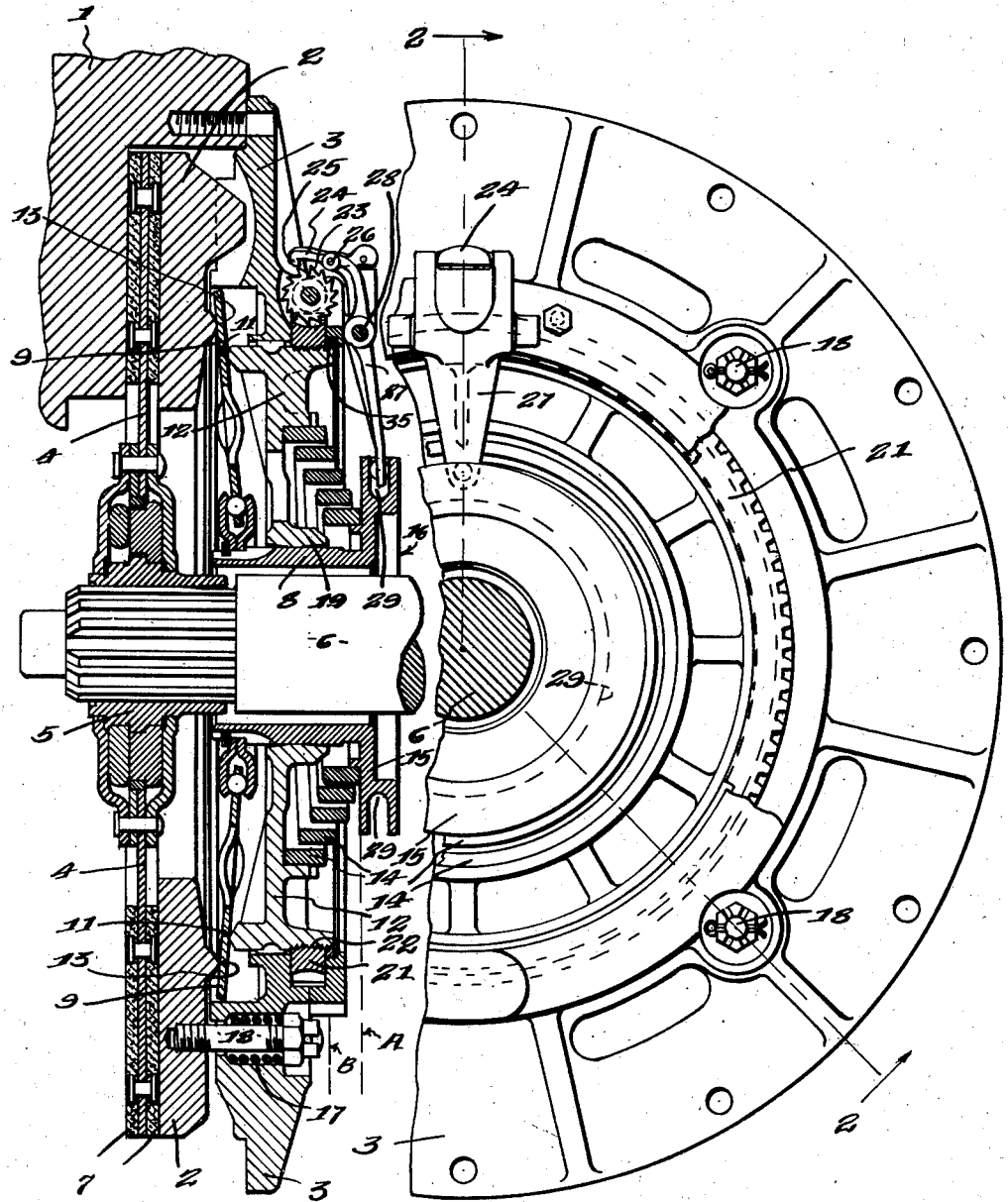
Figure 1 is a fragmentary rear elevation of a clutch embodying this invention.
Figure 2 is a vertical sectional view on line 2—2, Figure 1.

We have here shown the invention as embodied in a single plate friction clutch of the type used in motor vehicles. The clutch comprises, generally, driving and driven elements having coacting friction faces, one of which elements is shiftable axially into and out of engagement with the other, spring means for shifting the shiftable element into engagement with the other element, throw-out mechanism operable to release the shiftable element of the shifting-in force of the spring means, an abutment member, the throw-out mechanism including parts coacting with the abutment member during engagement of the clutch elements under the influence of the spring means to transfer the force of the spring means to the shiftable element, means for automatically shifting the abutment member axially to compensate for wear of the friction faces of the clutch elements, this adjusting or compensating means being operable by the throw-out mechanism, when the throw-out mechanism is released to permit re-engagement of the clutch, provided wear has occurred, and the adjusting or compensating means including a part, as a pawl, which normally idles during the operation of the throw-out mechanism when sufficient wear has not developed to require adjustment but which becomes active when sufficient wear does develop to require adjustment. The operation of said part of the adjusting mechanism depends on the return or retrograde movement of the throw-out mechanism or the throw-out sleeve thereof beyond its normal or starting position or the adjustment takes place when the clutch is out of full engagement. Normally, the throw-out sleeve starts from a predetermined position and moves therefrom to effect the throwing out operation and back to said starting position. When wear on the friction faces of the clutch occurs, the throw-out sleeve returns back beyond the normal starting position. When sufficient wear on the clutch faces has occurred to require adjustment, the throw-out sleeve moves its maximum distance beyond its starting position in a retrograde direction and permits the part which normally idles to become active, so that the next throwing out operation will effect the adjusting of the clutch to take up for wear and the stopping of the throw-out sleeve in its normal starting position.

The driving element of the clutch includes a member, which is usually the fly wheel 1 of an internal combustion engine, a pressure ring 2 rotatable with the fly wheel, a so-called back plate 3 secured to the fly wheel, and the driven member includes a disk 4 having a hub 5 mounted to slide axially on the clutch shaft 6. The disk 4 has friction rings or disks 7 on opposite sides thereof for coacting with a friction face on the fly wheel 1 and a friction face on the pressure ring 2. The pressure ring 2 is also shiftable axially relatively to the fly wheel 1.

The throw-out mechanism includes a throw-out sleeve 8 encircling the shaft and usually spaced therefrom, a series of levers 9 extending radially from the inner end of the sleeve 8 and suitably connected thereto, which levers are fulcrumed at 11 on the fulcrum member or abutment 12 and pressing at 13 on the pressure ring 2. The clutch is engaged by a spring, as 14, thrusting in opposite directions against the abutment 12 and against a collar 15 on the outer end of the throw-out sleeve. The throw-out sleeve is actuated from the usual clutch pedal through a fork on a yoke shaft, not shown, which fork coacts or thrusts against the surface 16 of the throw-out sleeve. The clutch here shown is of the push-in type, that is, a clutch that disengages upon the pushing in of the throw-out sleeve, that is, movement of the sleeve 8 to the left (Figure 2) causes the levers 9 or the inner ends thereof to move to the left and release the pressure of the levers on the fulcrum 11, thereby permitting the pressure ring 2 to release the driven member or disk 4. The pressure ring 2 is withdrawn to the right or released, when the throw-out sleeve 8 is moved inwardly to the left, by springs 17 interposed between the heads of studs 18 extending through the back plate and threading into the pressure ring, and the bottoms of the recesses in the back plate through which the studs 18 extend. The spring 14 thrusting against the throw-out sleeve 8 moves it to the right, when the clutch pedal is released and moves the levers 9 into the position shown in Figure 2, wherein they fulcrum on the fulcrum 11 and transfer the force of the spring 14 to the pressure ring 2 to engage the clutch.

The fulcrum member or abutment 12 is adjustable axially to take up for wear on the friction faces. It is mounted in the back plate 3 and is normally rigid, as a unit, with the back plate. It is here shown as provided with a hub portion 19 on the periphery of the throw-out sleeve 8, the inner surface of the hub being somewhat arcuate in cross-section engaging the periphery of the sleeve 8 at the apex portion of the arc. This construction permits a sort of universal joint action between the driving member of the clutch and the throw-out sleeve 8 to compensate for certain misalinements and to obtain equal pressure throughout the areas of the friction faces.

By this clutch construction, the driving member of the clutch and the parts of the throw-out mechanism carried thereby rotate as a unit. The type of clutch, that is, a clutch including a driving member, a pressure ring, back plate, driven disk, throw-out sleeve, motion transmitting and multiplying levers between the sleeve and the pressure ring, and a spring which reacts on the throw-out sleeve to return it to starting position and to beyond starting position, as the clutch wears, is not per se new. The broad feature of the invention is taking advantage of the re-action of the spring on the sleeve, when the sleeve shifts beyond normal starting position to operate an automatic take-up mechanism.

This invention relates to automatic adjustment of the fulcrum member or abutment 12 to compensate for wear of friction faces 7. The automatic adjusting means operable by the throw-out mechanism or the throw-out sleeve, in the illustrated embodiment of the invention, consists of a ring or annular nut 21 having threaded engagement at 22 with the abutment 12, the ring having peripheral gear teeth, and an intermittently operable actuator having teeth meshing with the gear teeth and also being formed to provide a ratchet wheel, a pawl coacting with the ratchet wheel, and connections operated by the throw-out sleeve for actuating the pawl.

In the form of the invention shown in Figures 2 and 3, the ring or nut 21 is shown as formed with peripheral worm gear teeth and the pinion 23ª is a worm and the teeth of the worm are also cut along lines parallel to the axis to form ratchet teeth 23.

24 designates the pawl having a nose or tooth 25 which coacts with the ratchet teeth 23. The pawl is here shown as pivoted at 26 to the outer end of a radial lever 27 pivoted between its ends at 28 and having its other end located in a circumferential groove 29 in the collar 15 at the outer or rear end of the throw-out sleeve 8. A spring 30 is interposed between the lever and the tail of the pawl and tends to actuate the pawl to move its tooth 25 against the ratchet teeth 23. The inclined or ratcheting surface 31 of each tooth 23 is of such length relative to the normal movement of the throw-out sleeve 8 that the nose or tooth 25 normally reciprocates or idles back and forth on the surface 31 of any tooth 23 until enough wear develops at the friction faces to permit the nose of the pawl to over-reach the end of the surface in the position shown in Figure 4. The normal starting position of the throw-out sleeve or the collar 15 thereof is indicated by the line A and the position this collar 15 assumes when the clutch throw-out mechanism is operated, indicated by the line B. The length of any of the ratcheting surfaces 31 to the distance between lines A—B is such that the pawl normally idles or reciprocates back and forth on the surface 31 of any one tooth. As, however, wear occurs at the friction faces, the throw-out collar gradually assumes a position more and more to the rear or to the right of the line A and finally upon predetermined wear, this excess distance to the right is sufficient to permit the nose 25 of the pawl to over-reach the end of the ratcheting surface and ratchet into engagement with the next tooth, so that when the clutch throw-out mechanism is again operated and the throw-out sleeve shifted to the left (Figure 2), the ratchet wheel, and hence the pinion or worm, will be turned, thus turning the ring or nut 21, and hence adjusting the abutment member 12 slightly inwardly or to the left to compensate for the wear.

The nut or adjusting ring 21 is suitably mounted in an annular recess in the back plate to be held from endwise or axial movement and for facilitating the assembly of the ring in the back plate, the back plate may be formed in two sections with a recess for the ring between the sections. A washer 35 of suitable yielding material, as felt, is interposed between the ring 21 and the back plate to guard against the entry of dust and grit into the threads between the ring 21 and the abutment 12. When the pawl 24 over-reaches one of the teeth, as just described, and is pressed by the spring 30 into engagement with the ratcheting surface of the tooth, it engages the ratcheting surface of the next tooth at 36 at a point removed from the tooth that it has just ratcheted out of engagement with leaving a lost motion between the nose of the pawl and the latter tooth. When the clutch throw-out mechanism is again operated to disengage the clutch, that is, when the throw-out sleeve is moved to the left (Figure 2), this lost motion is first taken up before the ratchet wheel and the worm is actuated. The lost motion is sufficient to permit the pressure ring 2 to release the driven element 4 of the clutch or permit the springs 17 to re-act sufficiently so that the adjusting ring 21 is turned while the clutch is disengaged. For the purpose of balancing the driving element, two sets of worms, levers 27, and pawls 24 may be used located diametrically opposite each other or the driving member may be balanced in any suitable manner.

In Figures 5 and 6, the adjusting ring or nut 21 is shown as provided with peripheral spur gear teeth meshing with the teeth 37 of the pinion 38, and the pinion 38 is shown as mounted on the stud 39 suitably mounted in the back plate structure 3, and in this form of our invention, the pawl 40 is shown as carried by the pinion and coacting with the ratchet wheel 41 mounted to rotate about the stud 39, the ratchet wheel being located in a recess in the side of the pinion 38 and is actuated by an oscillating lever arm 42. The lever arm 42 thus moves in a plane parallel to the plane of rotation of the clutch. It is actuated from the throw-out sleeve 8 through a lever 43. The lever 43 is pivoted at 44 to the back plate and has an angular arm 45 pivoted at 46 on the lever arm 42. Thus, during the movement of the throw-out sleeve 8, the lever 43 moves about its pivot 44 and hence rocks its angular arm 45, actuating the lever arm 42 radially in the plane parallel to the plane of rotation of the clutch, and hence actuating the ratchet wheel 41. The ratchet wheel 41 would idle relatively to the pawl 40 until enough wear has developed to permit the pawl 40 to move into engagement with a new tooth whereupon the pinion 38 would be rotating slightly to move the ring 21, and hence adjust the abutment 12, as before described.

In Figure 7, the lever 50, corresponding to the lever 27, (Figure 2), is formed with a pawl 51 rigid therewith coacting with a ratchet wheel 52 on a pinion corresponding to the pinion or worm 23. The lever is pivoted at 53 to a radially movable lever 54 mounted to rotate about the axis 55 of the ratchet wheel or pinion 52. The lever 50 coacts with the lever 54 with a stop joint which limits the relative pivotal movement of the levers 50 and 54 after the lever 50 has been moved a predetermined distance. This distance is indicated by the space at 56. Normally, when there is no appreciable wear of the friction faces, the pawl 51 idles on the ratcheting surface 57 of any tooth in juxtaposition thereto, and during the movement of the lever 50, the lever 44 moves as a unit therewith. When, however, sufficient wear develops, as before described, the pawl will overreach the ratcheting surface 57 and then upon initial throwing out movement of the lever 50, the pawl will move in the direction of the arrow X into the dotted line position 51ª (Figure 7) and then upon continued movement of the lever 50 will actuate the ratchet wheel or pinion 52 and the subsequent operation of the throw-out mechanism or lever 50, the pawl will idle on the ratcheting surface of the adjacent tooth until further wear develops when the operation will be repeated. When the pawl 51 is in the position shown by dotted lines 51ª (Figure 7), there is a lost motion between it and the tooth against which it will thrust, this being for the purpose of permitting the pressure ring 2 to release the disk 4 before the adjusting movement of the abutment 12 takes place, as before explained in connection with the construction shown in Figure 2.

In any form of the invention, the abutment is adjusted automatically by the ring which is intermittently actuated when sufficient wear occurs, and this ring is actuated by an actuator operated by the throw-out sleeve 8 through a lever, pawl and ratchet wheel after the holding-in pressure on the pressure ring is, for the most part, removed.

What we claim is:

1. In a spring loaded friction clutch including a back plate, an abutment carried by the back plate and adjustable axially of the clutch to take up for wear of the friction faces of the clutch, a spring operable to engage the clutch, and throw-out mechanism including a sleeve, and parts actuated thereby to transfer the movement of the sleeve to engage and disengage the clutch, said parts coacting with the abutment during engaging movement of the clutch, the sleeve having a normal starting position and being movable beyond said starting position, as the friction faces of the clutch wear; the combination of the spring of the clutch re-acting on the sleeve and tending to shift it beyond its normal starting position as the clutch wears and an adjusting nut member carried by the back plate and having threaded connection with the abutment, and means operable by the movement of the throw-out sleeve to actuate the nut member, when the throw-out sleeve starts from a position beyond its normal starting position.

2. In a spring loaded friction clutch including a back plate, an annular abutment carried by the back plate and adjustable axially of the clutch to take up for wear of the friction faces of the clutch, and throw-out mechanism including a sleeve, and parts actuated thereby to transfer the movement of the sleeve to engage and disengage the clutch, said parts coacting with the abutment during engaging movement of the clutch, the sleeve having a normal starting position and being movable beyond said starting position, as the friction faces of the clutch wear; the combination of a ring encircling the abutment and having threaded engagement with the periphery thereof and mounted in the back plate to be held from endwise movement, and means operable by the movement of the throw-out sleeve to actuate the ring when the throw-out sleeve starts from a position beyond its normal starting position.

3. In a spring loaded friction clutch including a back plate, an abutment carried by the back plate and adjustable axially of the clutch to take up for wear of the friction faces of the clutch, and throw-out mechanism including a sleeve, and parts actuated thereby to transfer the movement of the sleeve to engage and disengage the clutch, said parts coacting with the abutment during engaging movement of the clutch, the sleeve having a normal starting position and being movable beyond said starting position, as the friction faces of the clutch wear; the combination of a ring encircling the abutment and having threaded engagement with the periphery thereof and mounted in the back plate to be held from endwise movement, an actuator carried by the back plate and coacting with the ring and formed with ratchet teeth, a pawl coacting with the ratchet teeth, a carrier for the pawl connected to the throw-out sleeve to be actuated during the movement of the throw-out sleeve and move the pawl along the ratchet teeth, the length of the ratcheting surface of each tooth being so correlated with the length of the throw-out movement of the sleeve that the pawl normally idles on the ratcheting surface of any one tooth and ratchets off the same upon actuation of the throw-out sleeve from a position beyond normal starting position.

4. In a spring loaded friction clutch including a back plate, an abutment carried by the back plate and adjustable axially of the clutch to take up for wear of the friction faces of the clutch, and throw-out mechanism including a sleeve, and parts actuated thereby to transfer the movement of the sleeve to engage and disengage the clutch, said parts coacting with the abutment during engaging movement of the clutch, the sleeve having a normal starting position and being movable beyond said starting position, as the friction faces of the clutch wear; the combination of a ring encircling the abutment and having threaded engagement with the periphery thereof and mounted in the back plate to be held from endwise movement, the ring having gear teeth, an actuator including a pinion meshing with the gear teeth, pawl and ratchet wheel mechanism for actuating the pinion, and connections operated by the throw-out sleeve for operating the pawl and ratchet mechanism.

5. In a spring loaded friction clutch including a back plate, an abutment carried by the back plate and adjustable axially of the clutch to take up for wear of the friction faces of the clutch, and throw-out mechanism including a sleeve, and parts actuated thereby to transfer the movement of the sleeve to engage and disengage the clutch, said parts coacting with the abutment during engaging movement of the clutch, the sleeve having a normal starting position and being movable beyond said starting position, as the friction faces of the clutch wear; the combination of a ring encircling the abutment and having threaded engagement with the periphery thereof and mounted in the back plate to be held from endwise movement, the ring having gear teeth, an actuator including a pinion meshing with the gear teeth, pawl and ratchet wheel mechanism for actuating the pinion, and connections operated by the throw-out sleeve for operating the pawl and ratchet mechanism, the ratcheting surface of each tooth of the ratcheting mechanism being correlated as to length with the throw-out movement of the sleeve that the pawl and ratchet mechanism normally idles and the pawl ratchets into engagement with another tooth when the throw-out sleeve starts from a position beyond its normal starting position.

6. In a spring loaded friction clutch including a back plate, an abutment carried by the back plate and adjustable axially of the clutch to take up for wear of the friction faces of the clutch, and throw-out mechanism including a sleeve, and parts actuated thereby to transfer the movement of the sleeve to engage and disengage the clutch, said parts coacting with the abutment during engaging movement of the clutch, the sleeve having a normal starting position and being movable beyond said starting position, as the friction faces of the clutch wear; the combination of a ring encircling the abutment and having threaded engagement with the periphery thereof and mounted in the back plate to be held from endwise movement, the adjusting ring being formed with worm gear teeth, a worm carried by the back plate meshing with the worm teeth and being also formed with ratchet teeth, a pawl coacting with the ratchet teeth, and connections between the pawl and the throw-out sleeve for actuating the pawl, the length of the ratcheting surface of each tooth being so correlated with the length of the throw-out movement of the sleeve that the pawl normally idles on said ratcheting surface and ratchets off the same into engagement with the ratcheting surface of the next tooth when the throw-out sleeve starts from a position beyond its normal starting position.

7. In a spring loaded friction clutch including a back plate, an abutment carried by the back plate and adjustable axially of the clutch to take up for wear of the friction faces of the clutch, and throw-out mechanism including a sleeve, and parts actuated thereby to transfer the movement of the sleeve to engage and disengage the clutch, said parts coacting with the abutment during engaging movement of the clutch, the sleeve having a normal starting position and being movable beyond said starting position, as the friction faces of the clutch wear; the combination of a ring encircling the abutment and having threaded engagement with the periphery thereof and mounted in the back plate to be held from endwise movement, the ring having spur gear teeth, an actuator including a spur pinion meshing with the gear teeth, pawl and ratchet mechanism for actuating the pinion, and connections operated by the throw-out sleeve for operating the pawl and ratchet mechanism, when the sleeve starts from a position beyond its normal starting position.

CHARLES B. SPASE.
ROBERT S. ROOT.